May 19, 1970   R. W. LUEBKE   3,512,498
INERTIA-OPERATED IMPACT MONITOR AND INDICATOR FOR VEHICLES
Filed Dec. 17, 1968   3 Sheets-Sheet 1
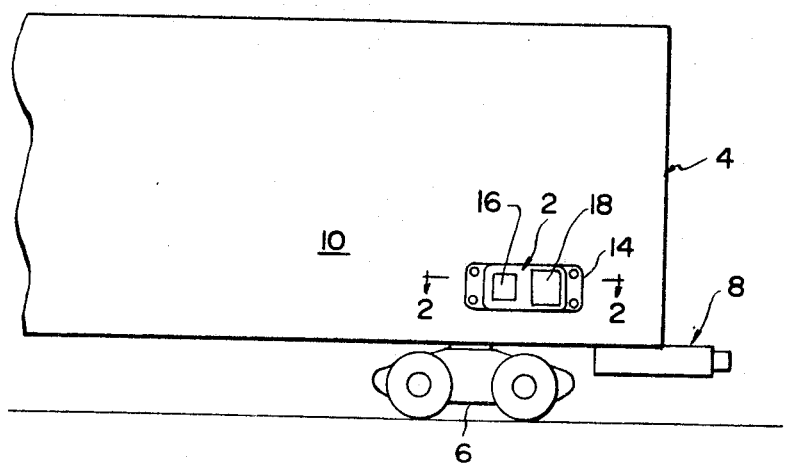
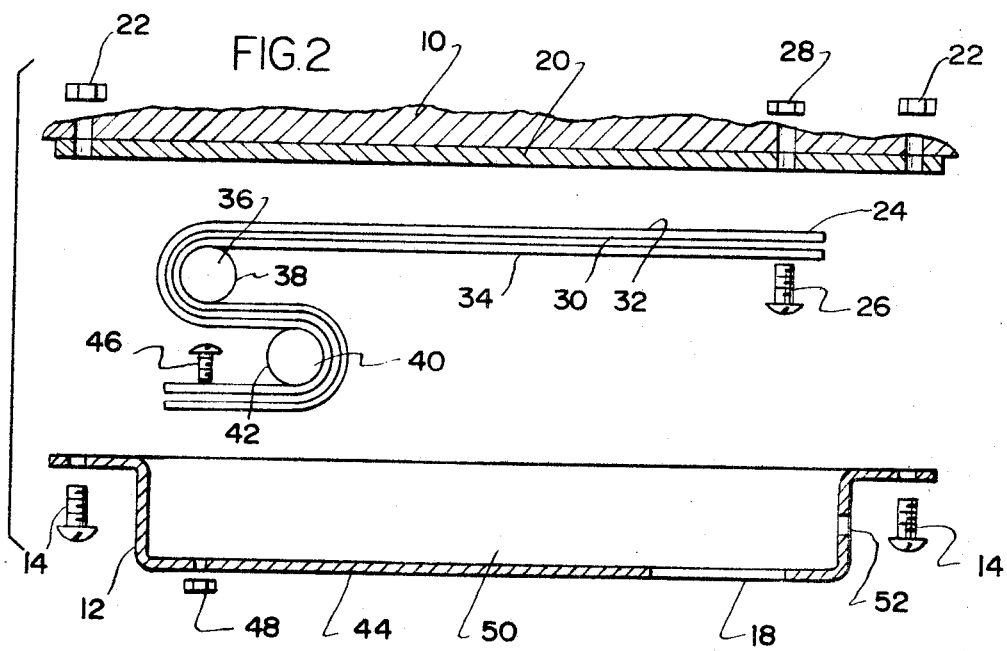
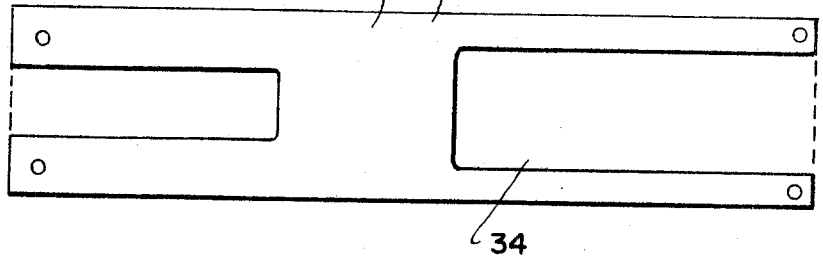
INVENTOR
ROBERT W. LUEBKE
BY Petherbridge, O'Neill & Aubel
ATTORNEYS.

May 19, 1970            R. W. LUEBKE            3,512,498
INERTIA-OPERATED IMPACT MONITOR AND INDICATOR FOR VEHICLES
Filed Dec. 17, 1968            3 Sheets-Sheet 2
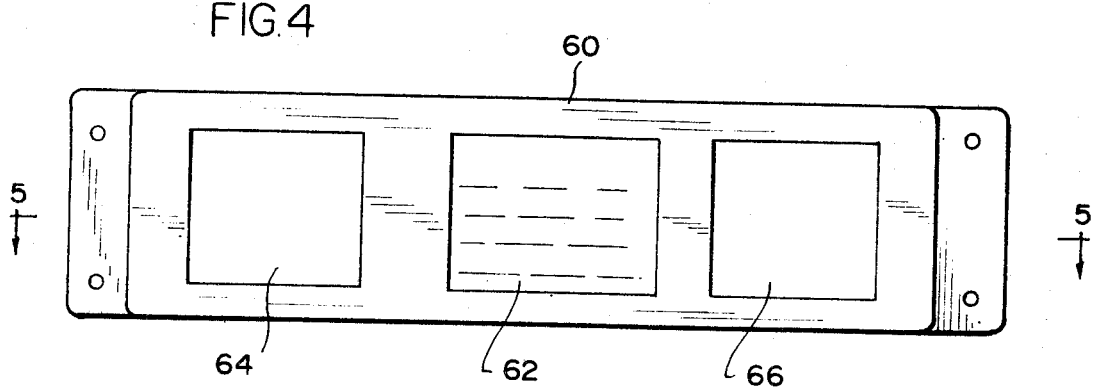
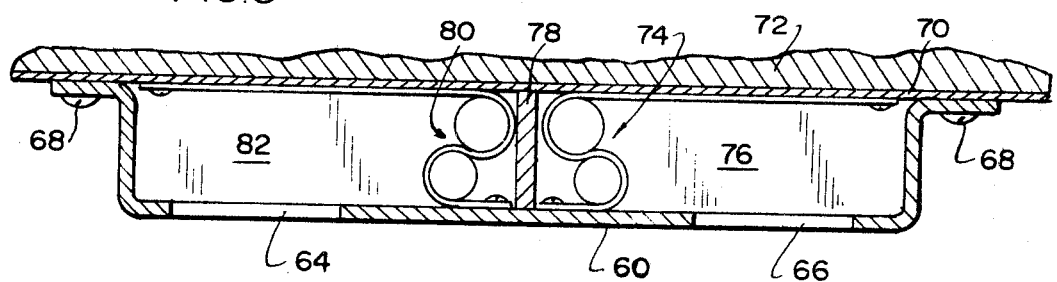
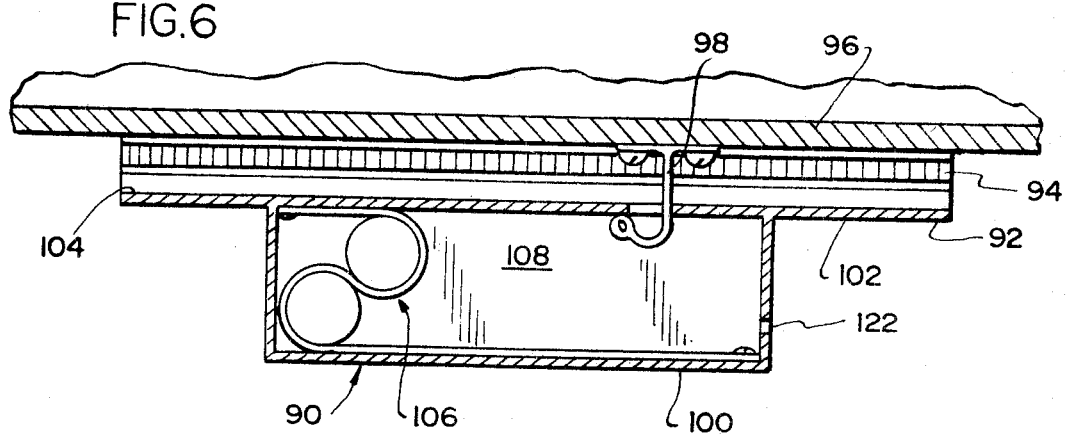
INVENTOR.
ROBERT W. LUEBKE
BY Petherbridge, O'Neill & Aukel
ATTORNEYS.

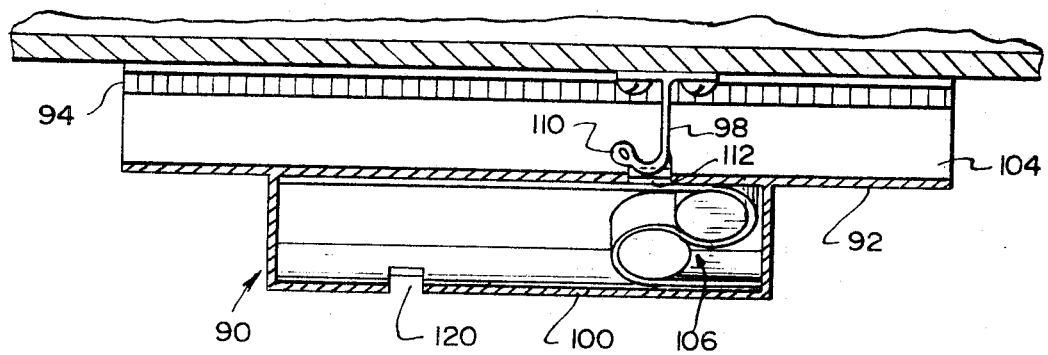
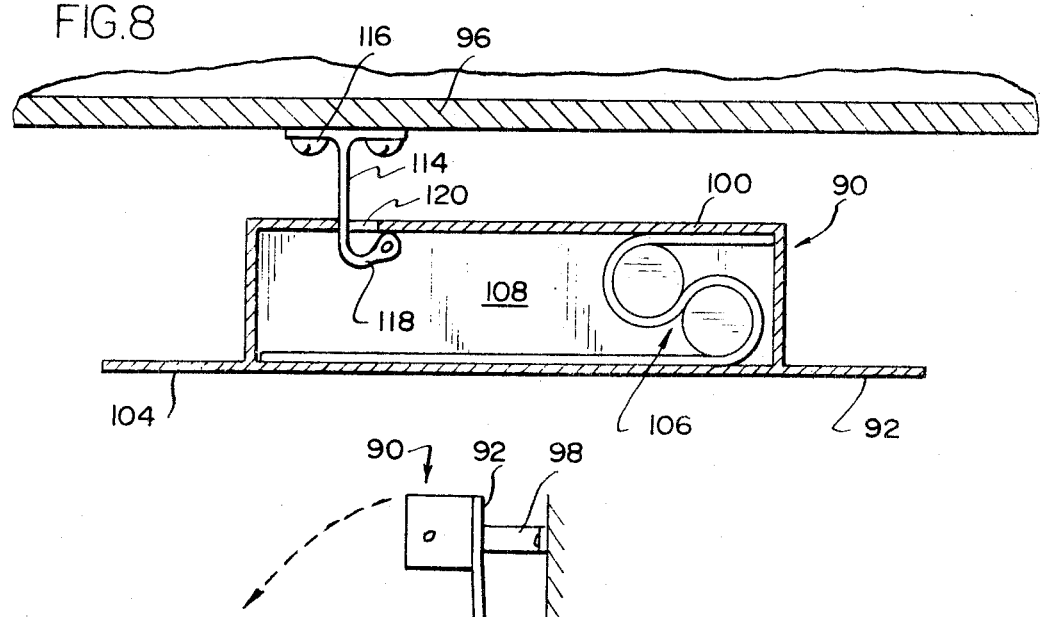
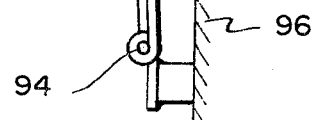

United States Patent Office 3,512,498
Patented May 19, 1970

3,512,498
INERTIA-OPERATED IMPACT MONITOR AND INDICATOR FOR VEHICLES
Robert W. Luebke, Baltimore, Md., assignor to General Standard Company, Chicago, Ill., a corporation of Illinois
Filed Dec. 17, 1968, Ser. No. 784,323
Int. Cl. G01p 15/00
U.S. Cl. 116—114                                11 Claims

ABSTRACT OF THE DISCLOSURE

An impact monitor and indicator, primarily for railroad cars, to indicate the receipt of an impact force thereby in excess of a predetermined magnitude. The impact monitor and indicator is designed to be attached to an object, such as a vehicle, and is inertia responsive to impacts sustained thereby to monitor and indicate the occurrence thereof. When an impact indication has been made by the device and observed, it may be reset for subsequent monitoring and indicating.

---

The present invention relates to an impact monitoring and indicating device for measuring and indicating the receipt of an impact force by the device. More particularly, the invention is directed to a device for measuring and indicating the receipt by an object, such as a railroad car, of an impact force in excess of a predetermined magnitude.

In recent years, the railroad industry has adopted and is using a variety of cushioning devices on its freight cars. These cushioning devices are designed primarily to protect the freight carried by the car from the damaging effects of shocks received during freight car coupling and switching operations.

In the use of freight car cushioning devices, however, normal wear and tear, excess abuse, or defective materials eventually lead to a gradual reduction in the cushioning capability of the devices. As the cushioning effectiveness of freight car cushioning devices diminishes, the car and ts contents become subjected to impact shocks of progressively greater magnitude. Since no effective and economical means has been developed to indicate the existence of a defective cushioning mechanism on a freight car, defective cushioning devices are generally detected only after the freight carried by the particular car has arrived at its destination in damaged condition on one or more occasions. In some instances, lading carried by a "cushioned" freight car may be damaged by heavy impact shocks produced by careless coupling or switching procedures carried out at excessive operational speeds.

The impact monitor and indicator apparatus of the invention has been designed to provide a means for effectively measuring or monitoring the effects of impacts sustained by a freight car and to indicate when such a freight car has sustained an impact which exceeds a predetermined force level and where this impact has been transmitted to the body of the freight car as well as its contents. This apparatus has been designed to make available to the railroad industry a relatively low cost impact monitoring system which can be relatively inexpensively applied to new freight cars or freight cars presently in service. While the subject impact monitor and indicator has been developed primarily for use in connection with freight cars, it must be appreciated that the device may be mounted upon various railroad cars, other vehicles and objects wherein it is desired to detect an impact of predetermined magnitude sustained thereby and to indicate by a reliable, relatively low cost device the occurrence of such an impact.

The impact monitor and indicator will provide a means for visually observing an indicator which will establish whether or not the body and contents of a freight car have been subjected to an impact shock in excess of the force level at which the indicator is designed to be actuated. When the indicator registers an excessive impact, railroad personnel are immediately alerted to the probability that either the cushioning device, provided on the car to cushion and prevent the transmission of shock loads to body and contents of the freight car, has become defective or partially inoperative or that the car has been subjected to abuse through careless coupling and switching procedures. By resetting the actuated impact monitor and indicator to its pre-responsive position, a car may be checked on the spot to determine whether the cushioning device has become defective and inoperative or whether careless coupling and switching procedures have caused the excessive impact indication. This can be readily accomplished by subjecting the car to a controlled coupling impact. If, following the controlled coupling procedure, the impact monitor and indicator of the invention has indicated that an excessive shock load has been transmitted to the body of the car and thereby its contents, it will be evident that the cushioning device is defective and that the cushioning mechanism must be repaired or replaced. If, on the other hand, the impact monitor and indicator is not actuated by the controlled coupling impact, it can be established that the car has probably been subjected to abuse during careless coupling or switching procedures.

The impact monitor and indicator developed by applicant is constructed with an elongated flat base plate which can be mounted upon a freight car, other vehicle or object. A housing is secured over the base and provides an enclosed operating channel for the inertia or force responsive elements of the device. A force bias band is secured to the flat base plate in substantially flat surface-to-surface contact therewith and extends from the point of securement to a roller. This roller is positioned within the channel provided between the housing and the base with the longitudinal axis of the roller being positioned in substantially normal relationship with respect to the longitudinal axis of the elongated force bias band and base plate. The roller is located in contact with a surface of the force bias band which is placed in surface-to-surface contact with the roller and encircles a major portion thereof. A second roller is aligned with its longitudinal axis in substantially parallel relationship with respect to the first roller and is positioned substantially directly opposite the first roller. The force bias band is wound around the second roller in a manner such that it encircles a major portion thereof. The relationship of the rollers to the band is such that the first roller is positioned in substantially surface-to-surface contact under a predetermined degree of tension with one of the surfaces of the force bias band and the second roller is positioned in substantially surface-to-surface contact under a predetermined degree of tension with the opposite surface of the force bias band. The rollers are thereby aligned in substantially parallel back-to-back relationship in a manner such that they are permitted to roll with respect to each other and the force bias band when they are subjected to an inertial force exceeding the predetermined holding force produced by the band tension and configuration.

The band extends from encircling relationship with respect to the second roller to a point on the housing opposite the point of securement of the band to the base plate. The band is secured to the frame of the housing at this point in substantially flat surface-to-surface contact with the frame and in generally parallel relationship with respect to the flat base plate.

The impact monitor and indicator apparatus is preferably mounted upon a freight car in a manner such that the longitudinal axis of the elongated force bias band is aligned in substantially parallel relationship with the direction of the primary anticipated impact force exerted upon the freight car, or, in other words, in generally parallel alignment with the longitudinal axis of the car body. When the device has been secured to the freight car, the rollers are moved to a preselected position within the channel provided by the housing and base where they will be able to respond to the movement of the band and roller assembly from the first position to the second position to provide a visually observable indication of the movement of the band and roller elements to the second position. Preferably, to prevent tampering, once the device has responded to an excessive impact, it is designed not to be reset until it has been examined by authorized railroad personnel.

When the rollers and band are moved to the first or pre-actuated position, they are held in this position by the tension in the force bias band which can be set at predetermined force responsive levels. These levels are determined by band geometry (i.e., removal of band segments will generally result in roller and band response to lower force levels) band thickness, band tension and roller size. These variables may be employed in connection with the spacing between the base and housing portion to which the band ends are connected to produce a responsive condition in these elements to predetermined forces. Therefore, when an excessive shock impact is transmitted to the body of a freight car and its contents because of a defective cushioning device or careless car coupling, the acceleration or inertial force applied to the rollers will overcome the tension of the force bias band. The rollers react with the band by snapping over with great rapidity to the second or actuated position within the housing, thereby actuating the indicator. The impact monitoring device has now been actuated and has provided a visually observable indication that the freight car body has sustained an impact in excess of that which the car is designed to safely absorb without damaging its contents.

Various other objects and advantages of the invention will become more fully apparent from the following description and drawings illustrating presently preferred embodiments thereof and wherein:

FIG. 1 is a partial side elevation of a cushioned freight car carrying an impact monitor and indicator device shown in enlarged relationship with respect to the freight car;

FIG. 2 is an exploded cross-sectional view of the impact monitor and indicator illustrated in FIG. 1;

FIG. 3 is a plan view of a force bias band illustrating the geometry thereof for producing a response at a predetermined force level;

FIG. 4 illustrates a side elevation of a modified embodiment of the device illustrated in FIG. 1;

FIG. 5 is a cross-sectional view of the device illustrated in FIG. 4 showing the dual roller and band elements for responding to shock impacts transmitted to the body of the freight car which exceed predetermined shock levels;

FIG. 6 is a cross-sectional view of a third embodiment of the impact monitor and indicator;

FIG. 7 is a cross-sectional view, with a portion thereof in perspective, illustrating the actuation of the indicator system in response to the displacement of the roller and band assembly;

FIG. 8 is a cross-sectional view of the modified embodiment of the impact monitor and indicator illustrated in FIG. 6 with the indicator of the device illustrated in FIG. 6 with the indicator of the device illustrated in actuated and locked condition with respect to the side of the freight car; and FIG. 9 is a side elevation of the modified embodiment of the impact montor and hinged indicator illustrated in FIG. 6 showing the device in pre-actuated position with respect to the side of a freight car to which it is secured.

Referring now to FIG. 1, in the preferred embodiment of the invention, the monitor and indicator device, generally indicated 2, is preferably mounted near one of the ends of a freight car, generally designated 4. The freight car illustrated in FIG. 1 is supported upon a typical wheeled under-carriage 6 and is provided with a cushioned coupling device, generally designated 8, the details of which are not shown and form no part of the invention. The cushion coupling device 8 is designed to be connected to the freight car 4 in a manner such that the shocks produced by the impact force in the coupling and uncoupling of freight cars is essentially absorbed by the device and is transmitted to the body of the freight car and its contents only to a minor degree. When such devices wear out or are defective, the impact force produced during the coupling and uncoupling of the freight car will be transmitted directly to the body of the freight car and to its contents which can then become relatively easily damaged.

The monitor and indicator device 2, shown in enlarged relationship with respect to the side 10 of a freight car body, includes a housing 12 which is secured to the freight car side 10 by bolts 14. The visible portion of the housing 12 is provided with an operating instruction label 16 and an indicator window 18 which is designed to provide for the visual observation of the condition of the monitor and indicator device in a preferred embodiment of the invention.

The details of the monitor and indicator device 2 shown in FIG. 1 are illustrated in the exploded cross-sectional view of FIG. 2. Here, it is shown that the device includes an elongated subtantially flat base 20 which can be secured to the side 10 of a freight car utilizing housing bolts 14 and nuts 22, or the base may be welded directly to the side 10 of the freight car or secured thereto in any preferred manner.

An elongated, generally flat force bias band 24, the particular geometric configuration of which is shown in FIG. 3, is secured at one of its ends by bolts 26 and nuts 28 to the base 20 as shown in FIG. 2. Preferably, the band 24, where secured to base 20, is positioned in substantially flat surface-to-surface contact with the base and in generally parallel alignment therewith. The force bias band 24 comprises a first surface 30 and a second surface 32. These band surfaces are aligned in opposed generally parallel relationship. As shown in FIG. 2, the second surface 32 of band 24 is located in surface-to-surface contact with the base 20 adjacent the area of securement to the base. As can be best seen in FIG. 2, an elongated, generally flat indicator band 34, fabricated from a flexible high visibility materal, is positioned in overlying relationship with respect to the first surface 30 of the force bias band 24 and is secured with the force bias band by bolts 26 and nuts 28 to the base 20. The elongated indicator band 34 extends generally coextensively with bias band 24 and in substantially continuous surface-to-surface contact therewith.

Referring to FIG. 2, the force bias band 24 is shown to extend along base 20 in generally parallel relationship therewith and to a first generally cylindrical roller 36. As is shown in FIG. 2, roller 36 is positioned with its longitudinal axis in substantially normal relationship with respect to the longitudinal axis of both bands 24 and 34. Band 24 together with overlying indicator band 34 extend around roller 36 under tension and in a manner such that a major portion of roller 36 is encircled by the bands. This encircling relationship is produced by the substantilly continuous surface to surface contact of first surface 30 of force bias band 24 and overlying indicator band 34 with the cylindrical outer peripheral surface 38 of first roller 36.

The bias band 24 extends under tension from partial encircling relationship with respect to the first roller 36 to second roller 40. The band similarly encircles a major portion of this second roller with the second surface 32 of force bias band 24 located in substantially continuous surface-to-surface contact with the outer cylindrical peripheral surface 42 of the second roller 40. As is shown in FIG. 2, rollers 36 and 40 are positioned in a manner such that their longitudinal axes are located in generally parallel alignment and in generally normal relationship with respect to the longitudinal axis of bands 24 and 34. The rollers are disposed in generally adjacent relationship opposite each other and on opposite sides of force bias band 24 and in inertia responsive rolling relationship therewith.

With further reference to FIG. 2, force bias band 24 and overlying indicator band 34 extend under a predetermined amount of tension from partial encircling relationship with respect to second roller 36 and 40 in generally parallel relationship with respect to an upper wall 44 of the housing 12 and to a point where the band ends are secured to upper wall 44 by bolts 46 and nuts 48. It is preferred that upper wall 44 of housing 12 is located in generally parallel alignment with the upper surface of base 20 when the housing is secured to the side of freight car. In this manner, the band ends, which are respectively connected to the base 20 and the upper housing wall 44 in essentially flat parallel relationship therewith, will also be disposed in parallel relationship with each other. The side walls 50 of housing 12, as shown in FIGS. 1 and 2 are aligned in generally parallel relationship and serve to contain the band and roller assembly and to prevent its displacement from its predetermined path of travel.

When the monitor and indicator device illustrated in FIGS. 1, 2 and 3 is assembled, the partially band encircled rollers 36 and 40 are positioned between the flat base 20 and the upper wall 44 of housing at the left hand side of the operating channel provided between housing 12 and base 20. The force bias band 24, which has been formed in the predetermined geometric configuration illustrated in FIG. 3 to control the tensile and flexural characteristics thereof, is secured between the base 20 and the upper wall 44 under a predetermined degree of tension. The tension serves to fix and maintain the position of rollers 36 and 40 together with band 24 in the left hand or pre-actuated position within housing 12 shown in FIG. 2. The predetermined band configuration and tension will therefore serve to maintain the roller and band elements in the pre-actuated position during shocks and impact forces which do not exceed the predetermined tension of the pre-actuated band and roller elements. However, when an impact force exceeds the predetermined pre-actuated tension of the band and roller elements, it will produce an inertial or acceleration force upon rollers 36 and 40 which will produce a rapid acceleration of the rollers overcoming the tension resistance of the force bias band 24 and causing the rollers to move to the right hand side of the housing 12 with great velocity. The rollers are thereby moved to the right-hand side of the housing 12 in a manner such that the indicator band 34 overlying first surface 30 of force bias band 24 will be brought into substantially surface-to-surface contact with upper wall 44 of housing 12 adjacent indicator window 18 formed in the upper wall 44 in a manner such that this portion of the high visibility indicator band 34 will be clearly visible through indicator window 18 to railroad personnel or to any inspector walking past freight car 4.

Once the roller and band elements have been actuated to produce an inertial response to an excessive impact and have been driven to the right-hand side or actuated position within housing 12 of the monitor and indicator device 2, the rollers 36 and 40 and band 24 will be retained in the actuated position until they have been manually reset. Resetting of the band and roller elements is accomplished in this embodiment of the device by inserting a rod or shaft (not shown) through opening 52 provided in an end of the housing 12, shown in FIG. 2, engaging indicator band 34, force bias band 24, and thereby roller 40 and manually pushing these elements to the left until the bandroller assembly tension is overcome and the roller and band elements develop acceleration force which drives them to the pre-actuated position within housing 12 whereby they are placed in condition for a subsequent impact response.

While the indicator band 34 illustrated in FIGS. 2 and 3 is shown to be coextensive with the force bias band 24, and is preferably fabricated from a flexible high visibility material which will be clearly observable when brought into surface-to-surface contact with indicator window 18, it will be possible in some applications of the device to merely secure a segment of an indicator band to the first surface 30 of the bias band in the area of the bias band which will be brought into surface-to-surface contact with indicator window 18 when the device has been actuated. Also, as an alternative, it will be possible in some applications merely to provide the force bias band 24 with a vivid, high visibility coloration in the area of surface-to-surface contact with indicator window 18 so that the actuated condition of the roller and band elements is readily apparent from a glance at the indicator window. Because of the depth of the channel between upper wall of housing 12 and base 20, the indicator portion of the device is virtually unobservable through indicator window 18 when the band and roller elements of the device are in the pre-actuated position.

Referring now to the modified embodiment of the invention illustrated in FIGS. 4 and 5, it can be seen that the housing 60 of the device encloses a dual monitoring and indicating system which is designed to react or respond to impact forces sustained by a freight car in either of the two longitudinal directions along the axis of the car body. The housing 60 is similar in most material respects to that shown in connection with the embodiment of FIGS. 1, 2 and 3. This housing, however, is provided with a centrally located instruction plate or label 62 bounded on the left by an indicator window 64 and on the right by an indicator window 66. As is illustrated in FIG. 5, housing 60 is secured by bolts 68 to an elongated flat base plate 70 and both, in turn, are secured to the side of a freight car 72. In this embodiment, a first band and roller assembly, generally designated 74, is positioned within channel 76 provided by the left-hand portion of base plate 70, housing 60 and center wall 78 connected between housing 60 and base plate 70. A second band and roller assembly, generally designated 80, is positioned within channel 82 formed by the left-hand portion of housing 60, base plate 70 and center wall 78.

As shown in FIG. 5, the first band and roller assembly 74 is positioned within channel 76 in a pre-actuated position, similar in all material respects to the rollerband assembly illustrated in FIG. 2 in connection with the first embodiment of the monitor and indicator device. The second band and roller assembly 80 located in channel 82 is similarly positioned in a pre-actuated position. This dual assembly serves to produce an inertial or acceleration force response by one or the other of the band and roller assemblies caused by an excessive impact force from either of the longitudinal axial directions of the force bias bands. When a force of excessive magnitude is sustained by the freight car to which the device is attached, one of the band and roller assemblies will be driven from the pre-actuated position to the actuated position whereby the indicator carried thereby will be brought into surface-to-surface contact with its respective indicator window. This will establish the occurrence of an excessive impact by the freight car from one direction along its axis. The other band and roller assembly will remain in its pre-actuated position until an excessive force from the opposite axial direction is sustained by the freight car.

An additional embodiment of the invention is illustrated in FIGS. 6 through 9 of the drawings. Referring first to FIG. 9, a modified monitor and indicator device, generally designated 90, is secured to an enlarged generally flat base plate 92. The base plate pivotally mounted by hinge 94 to the side of a railroad freight car 96. The monitor and indicator device 90 carried by the base plate 92 is detachably secured to a hook element 98, which is secured to the side of the freight car as can be best seen in FIGS. 6 and 7. The base plate 92 and device 90 secured thereto, in the pre-actuated or latched position shown in FIG. 9, are aligned at an angle with respect to the plane of the outer surface of freight car 96 to insure the downward pivotal movement of device 90 and plate 92 about hinge 94 when hook element 98 is detached by the inertial responsive actuation of the device.

Referring now to FIG. 6, it can be seen that the monitor and indicator device 90 is basically similar in construction and function to previously discussed embodiments. The device 90 is constructed with a housing or frame 100 which is secured to the enlarged base plate 92. The housing 100 is similar in most material respects to that shown in connection with the embodiment of FIGS. 1, 2 and 3. However, in this embodiment of the device, the indicator windows have been eliminated from the housing and replaced instead by the enlarged base plate 92. When this base plate is in the pre-actuated position shown in FIGS. 6 and 9, the outer or normally exposed surface 102 of the base plate is colored similarly to the adjacent exposed surface of the freight car to which it is attached. The opposite base plate surface 104 is colored in visibly sharp contrast to that of the adjacent freight car surface and is stencilled to indicate that the device has been actuated and that the freight car has been subjected to excessive impact which may have damaged the car, its contents or both.

The roller and band assembly of device 90, generally designated 106, is positioned within a channel 108 provided between the base plate 92 and the outermost wall of housing 100. As is shown in FIG. 6, the band and roller assembly 106, which operates in a manner substantially similar to the device illustrated in FIGS. 1, 2 and 3, is initially positioned within channel 108 in a tensioned, pre-actuated position. When an impact force exceeds the predetermined pre-actuated tension of the band and roller assembly 106, an inertial or acceleration force will be directed to the rollers of the assembly. This force will cause the rollers to rapidly accelerate, thereby overcoming the pre-determined tension resistance of the force bias band and ultimately causing the rollers to move to the right hand side of the housing 100 at a substantial velocity.

As can be seen in FIG. 7, the movement of the roller and band assembly 106 to the right hand or actuated side of housing 100, upon the occurrence of an excessive impact force, will produce the disengagement or unlatching of the hooked end 110 of hook element 98. The inertial rolling response of the roller and band assembly 106 within channel 108 will produce the partial resilient compression of the hooked end 110 of the resilient hook element 98. When this occurs, natural gravitational forces produced by the canting or angular hinging of the device 90 and base plate 92 with respect to the freight car body will cause the compressed hooked end of the hook element 98 to be withdrawn through slot 112 provided in the base plate 92. The device 90 and base plate 92 can then be gravitationally pivoted downwardly about hinge 94 to the position illustrated in FIG. 8.

The momentum of the pivoting assembly comprising the device 90 and base plate 92 will produce the latching or locking engagement of the housing 100 of device 90 by a second hook element 114 which is secured by bolts 116 to the outer surface of freight car 96. This second hook element 114 is similar to hook element 98 and includes a flexible hook end 118 which is designed to be compressed and pushed through slot 120 formed at the lower end of the outer wall of housing 100. Therefore, as the monitor and indicator device 90 and base plate 92 pivot about hinge 94 in a generally downward direction, the slot 120, which is previously aligned with hook element 114 when the unit is installed on the freight car, impacts the hooked end 118 of hook element 114. The walls bordering slot 120 act in co-operation with the momentum produced by the pivoting assembly, to partially compress the flexible hooked end 118 to permit its entry into and through slot 120. When the hooked end 118 completely passes through slot 120, it resiliently responds by expanding and preventing the accidental disengagement of the housing from the hook element 114.

When the monitor and indicator device 90 of this modified embodiment has been actuated in response to an excessive shock sustained by a railroad freight car and is in a position illustrated in FIG. 8, previously concealed base plate surface 104, which is preferably a high visibility color in sharp contrast with the color of the freight car, is clearly exposed for visual observation by railroad personnel.

The device 90 may be reset and restored to a pre-actuated condition in a manner similar to that discussed in connection with the embodiment illustrated in FIGS. 1, 2 and 3. This is accomplished by manually moving the roller-band assembly 106 to the pre-actuated left-hand position with a rod (not shown) inserted through an opening 122 in housing 100 as shown in FIG. 6. This will cause the compression of hooked end 118 of the hook element 114. The hook may then be withdrawn from the housing; and the assembly, comprising the device 90 and base plate 92, can be pivoted about hinge 94 to produce the compression of hooked end 110 of hook element 98 so that it may be inserted through slot 112 and the housing can be locked in the pre-actuated position in condition for a response to a subsequent impact.

Various modes of carrying out the invention are contemplated as being within the scope of the following claims particularly pointing out and distinctly claiming the subject matter which is regarded as the invention.

What I claim is:

1. An impact monitoring device for indicating the impacting of an object at a predetermnied force comprising a base, an elongated force bias band secured at a first end thereof to the base, indicator means for indicating a predetermined condition of the force bias band, a first roller disposed in rolling engagement with a first surface of the force bias band, a second roller disposed in rolling engagement with a second surface of the force bias band and substantially opposite the first roller, the first and second rollers being aligned in substantially parallel relationship on opposite sides of said force bias band, a force bias band support and roller retaining frame connected to the base and having a portion thereof disposed in spaced relationship with respect to the base to permit band and roller movement between the frame and base, a second end of the force bias band being secured to the support frame to align the first and second secured force bias band ends in spaced apart parallel relationship, the support frame being formed to permit operation of the band condition indicator means and to permit the controlled movement of the rollers with respect to the band.

2. An impact monitoring device according to claim 1 wherein the second surface of the first end of the force bias band is secured to the base in substantially flat surface to surface contact with the base; the first surface of the band extends from the area of base securement, under a predetermined degree of tension, in surface to surface contact with and encircling a major portion of the first roller; the second surface of the band, opposite the first surface and extending in parallel relationship therewith, extends from the area of base securement, under a predetermined degree of band tension, in substantial surface to surface contact with and encircling a major portion of the second roller; the force bias band extends under tension from encircling relationship with the first and second rollers to the support and retaining frame; the first surface of the second end of the force bias band is secured to the frame in substantially flat surface to surface contact with a portion of the frame and in generally parallel alignment with the portion of the second surface secured to the base.

3. The impact monitoring device of claim 1 wherein the base is mounted upon an object for monitoring an impact thereof, the base being mounted upon the object in a manner such that the longitudinal axis of the elongated force bias band is aligned in substantially parallel relationship with the direction of the primary anticipated impact forces and the longitudinal axes of the first and second rollers are disposed in substantially normal relationship to the primary anticipated impact force to permit an indication by the indicator means of the receipt by the object of an impact of a predetermined force.

4. The impact monitoring device of claim 3 wherein the object is a vehicle.

5. An impact monitoring device according to claim 3 wherein a second device is mounted upon the object in a manner such that the longitudinal axis of the elongated force bias band thereof is aligned in substantially parallel relationship with the direction of the primary anticipated impact force and the longitudinal axis of the first and second rollers thereof are disposed in substantially normal relationship to the primary anticipated impact force, the rollers and bias bands of the devices being positioned in essentially opposite force responsive positions whereby a primary impact force in one direction will actuate one of the devices and a primary impact force in the opposite direction will actuate the other device.

6. The impact monitoring device of claim 1 wherein the indicator means is provided on the force bias band and comprises an indicator band disposed in overlying relationship with respect to the first surface of the bias band to indicate, upon movement of the bias band, of the occurrence of a predetermined impact condition.

7. The impact monitoring device of claim 1 wherein the bias band support and roller retaining frame overlies the band between the area of base securement and the area of frame securement and substantially encloses the bias band and rollers, the rollers and bias band are disposed in the enclosure provided by the base and frame in an initial force responsive position whereby an impact of a predetermined magnitude will produce a rolling movement of the rollers with respect to the longitudinal axis of the force bias band, a movement of the band in response to the impact force, and the actuation of the indicator means by the band and roller movement to indicate the occurrence of an impact of predetermined magnitude.

8. The impact monitoring device of claim 7 including means for restoring the rollers and bias band to the initial force responsive position for a subsequent impact monitoring.

9. The impact monitoring device of claim 8 wherein the enclosure formed by the frame and the base serve to substantially conceal the rollers and bias band from normal visual observation, an indicator band is disposed in overlying relationship with respect to the first surface of the bias band to indicate when the roller and bias band have been displaced from the initial force responsive position by a predetermined impact force, and window means are provided in the frame to permit the visual observation of the indicator band in an impact registering condition.

10. The impact monitoring device of claim 8 wherein the monitoring device is pivotally mounted upon the side of a vehicle, a first disengageable locking element is connected to the vehicle and releasably engages the monitoring device in a first locked position, the first locking element projecting into the enclosure formed by the bias band support and roller retaining frame and base when the rollers and bias band are positioned in an initial impact force responsive position and releasably engaging a wall thereof, the movement of the bias band and rollers in response to an impact of predetermined magnitude serving to disengage the first locking element from the monitoring device to produce the pivotal movement thereof with respect to the vehicle thereby indicating an impacted condition.

11. The impact monitoring device of claim 10 wherein a second locking element is connected to the vehicle in a position thereon to engage the monitoring device in a locked position following the pivotal movement thereof in response to an impact of predetermined magnitude, means are provided for restoring the rollers and bias band to the initial force responsive position and for unlocking the second locking element to permit engagement of the first locking element for a subsequent impact monitoring.

References Cited

UNITED STATES PATENTS

| 1,745,522 | 2/1930 | Baskerville. | |
|---|---|---|---|
| 2,825,297 | 3/1958 | Harrison | 116—114 |
| 3,140,910 | 7/1964 | Duke et al. | 73—492 |

FOREIGN PATENTS 163,713    10/1905    Germany.

LOUIS J. CAPOZI, Primary Examiner

U.S. Cl. X.R.

73—12, 492